United States Patent
Grivna

(10) Patent No.: US 8,405,622 B2
(45) Date of Patent: Mar. 26, 2013

(54) CAPACITANCE SENSOR, SENSE METHOD, AND MANUFACTURING METHOD

(75) Inventor: Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 1099 days.

(21) Appl. No.: 12/321,661

(22) Filed: Jan. 23, 2009

(65) Prior Publication Data

US 2009/0184937 A1    Jul. 23, 2009

Related U.S. Application Data

(60) Provisional application No. 61/022,880, filed on Jan. 23, 2008.

(51) Int. Cl.
*G06F 3/044* (2006.01)

(52) U.S. Cl. ...................................................... 345/173

(58) Field of Classification Search .................... 345/173
See application file for complete search history.

(56) References Cited

U.S. PATENT DOCUMENTS

| | | | | |
|---|---|---|---|---|
| 5,867,151 A | * | 2/1999 | Nakai | 345/173 |
| 6,813,957 B1 | * | 11/2004 | Platz | 73/780 |
| 2005/0030048 A1 | * | 2/2005 | Bolender et al. | 324/661 |

OTHER PUBLICATIONS

U.S. Appl. No. 12/239,610, Grivna, Edward L.

* cited by examiner

*Primary Examiner* — William L Boddie
*Assistant Examiner* — Andrew Schnirel

(57) ABSTRACT

A touch screen may include pixel elements formed in a display substrate that are spaced from one another by an element spacing. A plurality of capacitance sense pads may be formed from a same conductive transparent layer in an array over the display substrate. Each sense pad may be separated from an adjacent sense pad by a pad spacing aligned within element spacing for a uniform light path for the pixel elements.

5 Claims, 7 Drawing Sheets

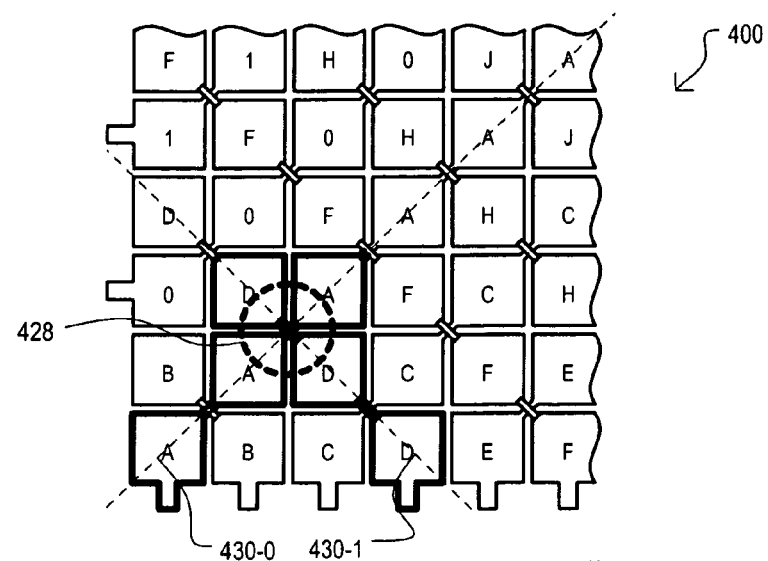
FIG. 4
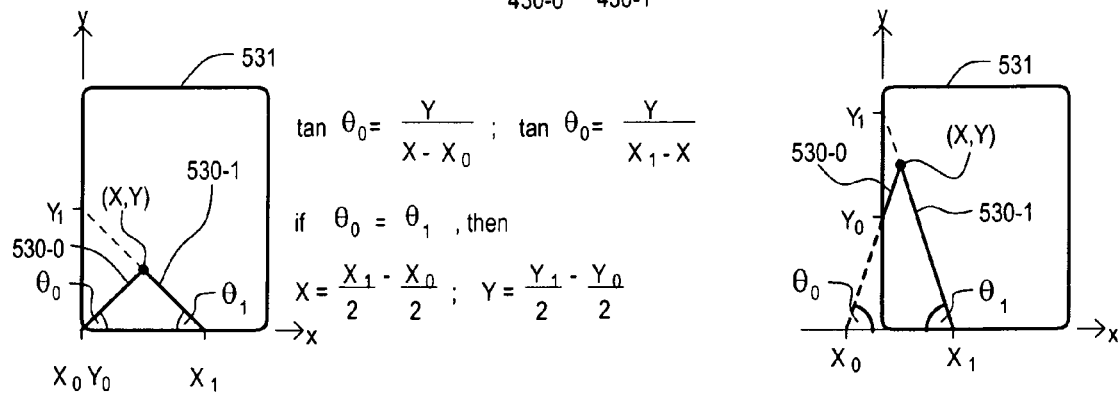
$$\tan \theta_0 = \frac{Y}{X - X_0} \;;\; \tan \theta_0 = \frac{Y}{X_1 - X}$$
if $\theta_0 = \theta_1$, then
$$X = \frac{X_1}{2} - \frac{X_0}{2} \;;\; Y = \frac{Y_1}{2} - \frac{Y_0}{2}$$
FIG. 5A
FIG. 5B
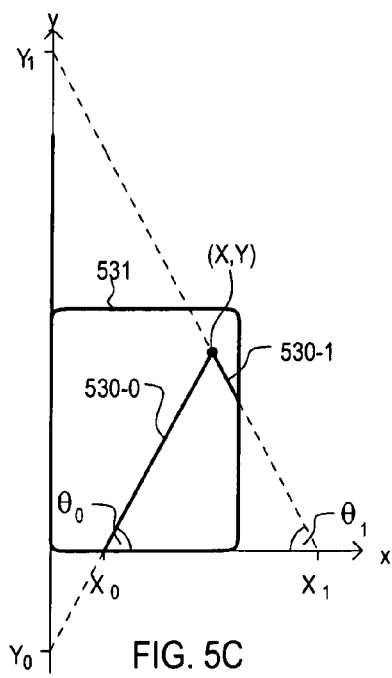
FIG. 5C

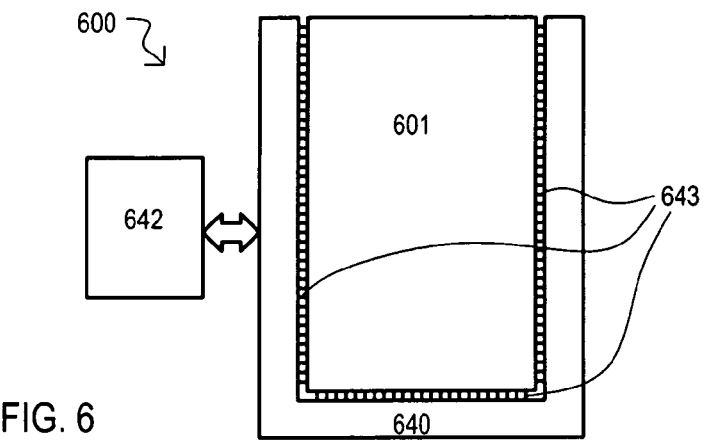
FIG. 6
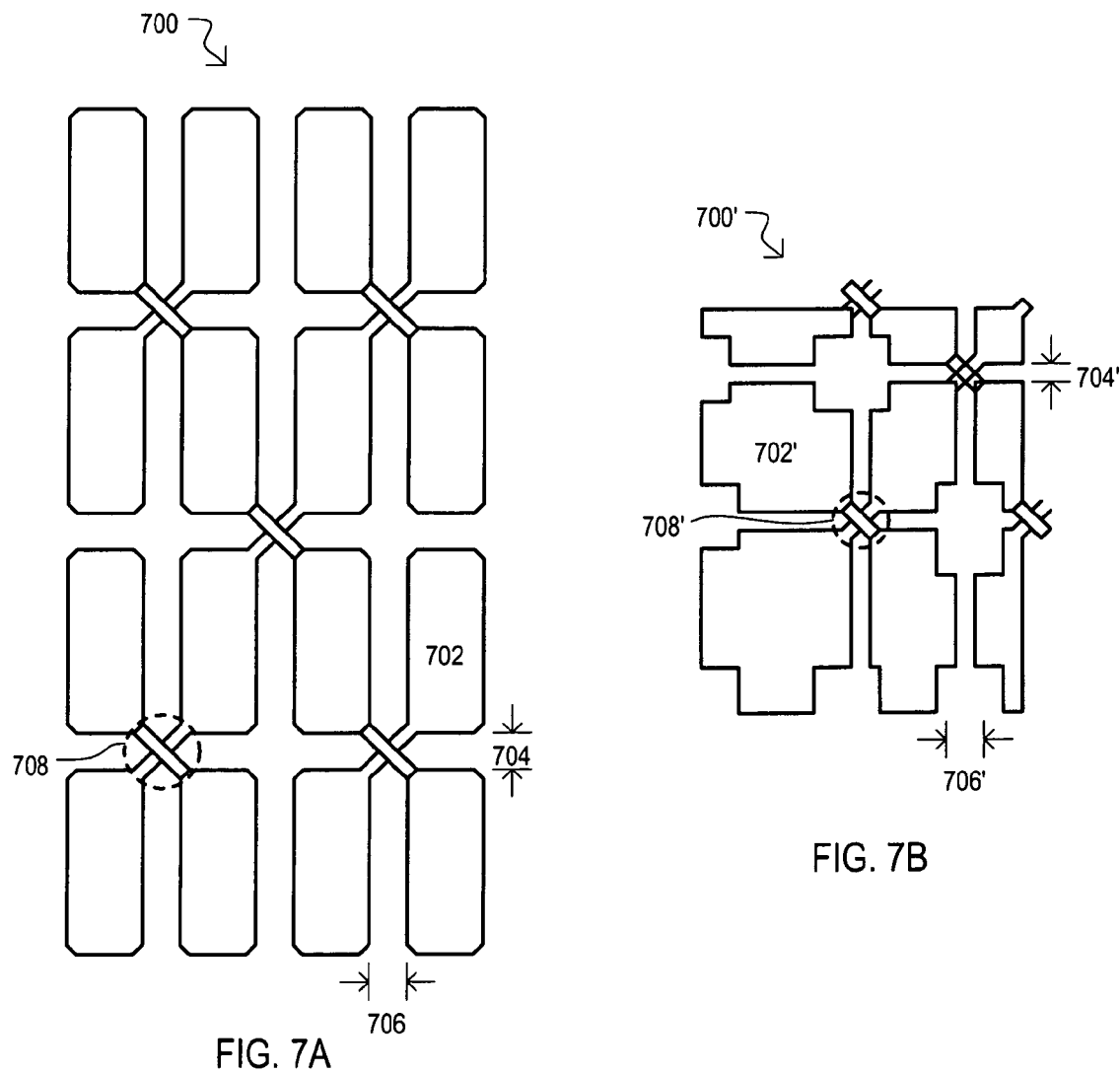
FIG. 7A
FIG. 7B

CAPACITANCE SENSOR, SENSE METHOD, AND MANUFACTURING METHOD

This application claims the benefit of U.S. provisional patent application Ser. No. 61/022,880 filed on Jan. 23, 2008, the contents of which are incorporated by reference herein.

TECHNICAL FIELD

The present disclosure relates to capacitance sensors, and more particularly to capacitance sensors used in conjunction with imaging devices, such as touch screens, and the like.

BACKGROUND

Capacitance sensors may detect a change in capacitance to thereby indicate contact (e.g., by one or more fingers) with a surface. Capacitance sensors can be formed of a transparent material over a display to create touch screen devices.

Touch screens formed with multiple layers of capacitance sensors may be expensive and difficult to manufacture. With multiple capacitance sense layers a bonding material formed between each group of capacitance sensors may cost more than the capacitance sensors themselves. Further it may be difficult to align each capacitance sense layer with one another, leading to complex and/or expensive manufacturing processes.

BRIEF DESCRIPTION OF THE DRAWINGS

FIG. 4 is a top plan view showing a position conversion approach according to an embodiment.

FIGS. 5A to 5C are diagrams showing examples of position conversion methods according to embodiments.

FIG. 6 is a block schematic diagram of a touch screen system according to an embodiment.

FIGS. 7A and 7B are diagrams showing capacitance sense arrays according to embodiments.

DETAILED DESCRIPTION

Figure 1:
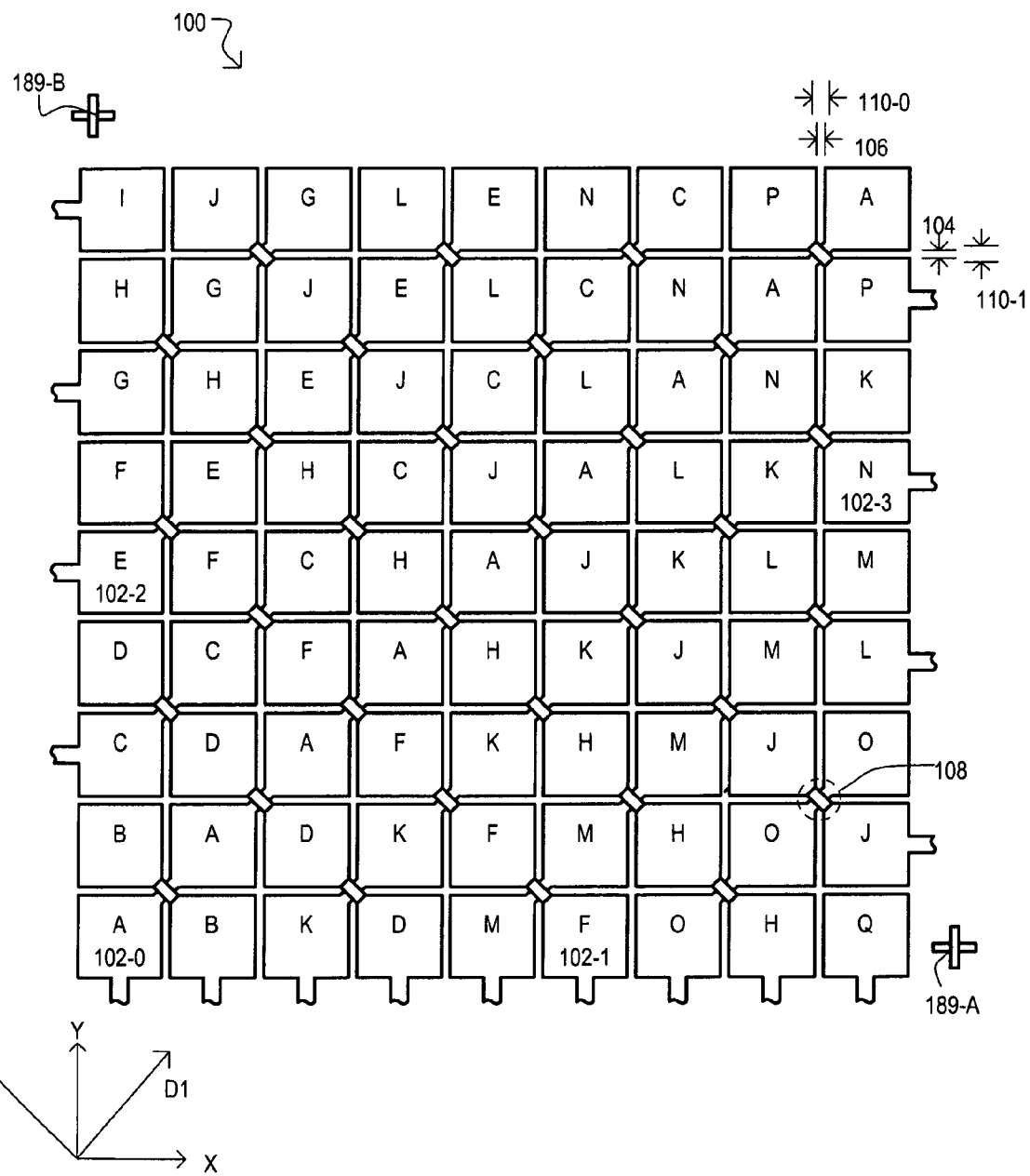
FIG. 1 is a top plan view of a capacitance sense array according to an embodiment.

Various embodiments will now be described that show devices and methods related to a capacitance sensor for use in combination with a display. Such embodiments may be used in a touch screen device, for example. In the various embodiments, like features are referred to with the same reference character but with the leading digit(s) corresponding to the figure number.

Referring to FIG. 1, a capacitance sense array is shown in top view and designated by the general reference character 100. A capacitance sense array 100 may include a number of sense pads (selected shown as 102-0 to 102-3). Sense pads (e.g., 102-0 to 102-3) may be formed from a material that may be both conductive and transparent. Sense pads may be spaced from one another by a pad spacing. As will be illustrated by more specific embodiments below, a pad spacing may be vertically aligned with pixel element spacings of a corresponding display. In such an arrangement, elements may be situated below a single sense pad layer to provide a uniform medium through which light may be transmitted from a display.

In addition, sense pads (e.g., 102-0 to 102-3) may be conductively connected to one another in groups. In particular embodiments, such connections may include bridges where one conductive connection passes over (or under) another. Such connections may also be aligned with pixel element spacings to prevent such features from presenting a non-uniform light transmission path.

Referring still to FIG. 1, sense pads (e.g., 102-0 to 102-3) may be arranged into an array, with sense pads extending in two directions. In the very particular embodiment shown, sense pads (e.g., 102-0 to 102-3) may be physically arranged (but not electrically connected) into an orthogonal array, extending in both a first direction (shown as X), as well as a second direction (shown as Y). In such an arrangement, sense pads (e.g., 102-0 to 102-3) may be separated from one another by a pad spacing. In the embodiment of FIG. 1, this may include a "Y" pad spacing (e.g., 104) and an X pad spacing (e.g., 106). Such sense pad spacings need not be uniform, but as noted above, may fit within a pixel element spacing. For example, a pixel element spacings for both directions are shown as 110-0 and 110-1.

As noted above, sense pads (e.g., 102-0 to 102-3) may be conductively connected to one another in groups. In the embodiment shown, conductive connections between sense pads may be by way of a bridging structure that provides a conductive connection between adjacent sense pads in a direction different from an array direction (in this example the X and Y direction). In the particular example of FIG. 1, bridging structures (one shown as 108), may provide a conductive connection between sense pads in both a first diagonal direction (shown as D1) and a second diagonal direction (shown as D2). This may result in sense pads groups arranged in the two diagonal directions. In FIG. 1, sense pads (e.g., 102-0 to 102-3) of a same group share a same letter label. Thus, bridging structure 108 provides a conductive connection between sense pads of group "O" in a first diagonal direction (D1), as well as a conductive connection between sense pads of group "J" in a second diagonal direction (D2).

A capacitance of non-orthogonal groups of sense pads (e.g., 102-0 to 102-3) may be sensed to determine a position of contact on sense pad array 100. Accordingly, each group of sense pads may have an interface sense pad on a periphery of sense pad array 100 that may allow a capacitance of the sense pad group to be sensed. For example, in FIG. 1, sense pad 102-0 may be an interface sense pad for group "A" that extends in diagonal direction D1. Sense pad 102-1 may be an interface sense pad for group "F" that extends in diagonal direction D2. Sense pad 102-2 may be an interface sense pad for group "E" that extends in diagonal direction D1. Sense pad 102-3 may be an interface sense pad for group "N" that extends in diagonal direction D2.

In the very particular example of FIG. 1, a capacitance sense array 100 may also include two or more alignment features 189-A and 189-B. Alignment features may enable edges of capacitance sense pads (e.g., 102-0 to 102-3) as well as bridging structures (e.g., 108) to be aligned within pixel element spacings. While alignment features (189-A and 189-B) of FIG. 1 are shown to be separate from capacitance sense pads, in alternate embodiments, certain capacitance sense pads may function as alignment features. More particularly, capacitance sense pads at opposite corners of a capacitance sense pad array 100 may be alignment features.

In this way, a capacitance sense array may include sense pads having a spacing that may be aligned between pixel elements for a uniform light path for such elements.

Referring to FIGS. 2A to 2E, various examples showing an alignment of sense pads with pixel element spacings are shown in a series of top plan views.

Figure 2A:
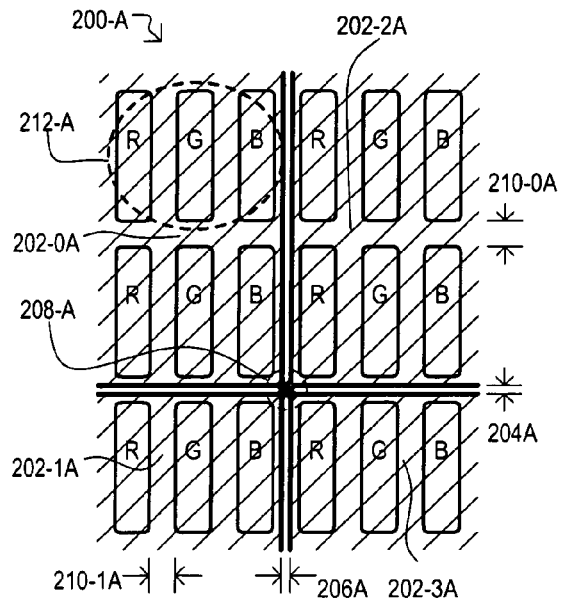
FIGS. 2A to 2E are top plan views of capacitance sense arrays according to embodiments.

FIG. 2A shows a first example of a touch screen embodiment. A capacitance sense array 200-A having sense pads 202-0A to 202-3A (portions of which are shown with hatching) may be formed over a display having pixels (one shown as 212-A), each formed by a number of pixel elements.

In the very particular example shown, a display may be a red/green/blue (RGB) type display, where each pixel includes a red pixel element (R), a green pixel element (G) and a blue pixel element (B). Such elements (R,G,B) may be spaced from one another by element spacings. In the particular example of FIG. 2A, pixel elements may be arranged in an orthogonal array, matching an orientation of sense pads. Thus, pixel elements (R,G,B) may have a first pixel element spacing (210-0A) in a Y direction, and second pixel element spacing (210-1A) in an X direction.

In the embodiment shown, a sense pad spacing 204A may be aligned to fall within a first pixel element spacing 210-0A, while a sense pad spacing 206A may be aligned to fall within a first pixel element spacing 210-1A. In such an embodiment, pixel elements may have light paths through sense pads, and not through spacings between sense pads.

FIG. 2A also shows a bridging structure 208-A, also formed within a pixel element spacing. A bridging structure 208-A may provide a conductive connection between sense pads 202-0A and 202-3-A and/or 202-1A and 202-2A. A bridging structure 208-A may include any of the various bridging structures, or portions of such structures described herein, or equivalents.

While FIG. 2A shows a sense pad array in which pad spacings are aligned along pixel boundaries, alternatively, pad spacings may be aligned along pixel element boundaries that do not fall between pixels. That is, pad spacings may fall within pixel boundaries. One particular embodiment showing such an arrangement is shown in FIG. 2B.

Figure 2B:
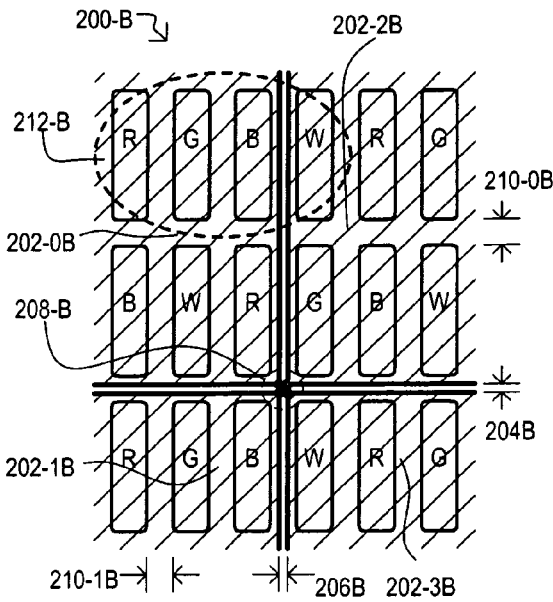

FIG. 2B shows the same general arrangement as FIG. 2A, however, a display may be an RGBW type display (i.e., each pixel also includes a white pixel element), and a spacing 206B between sense pads 202-0B and 202-2B may align with a pixel element spacing that falls between pixel elements of a same pixel 212-B.

Figure 2C:
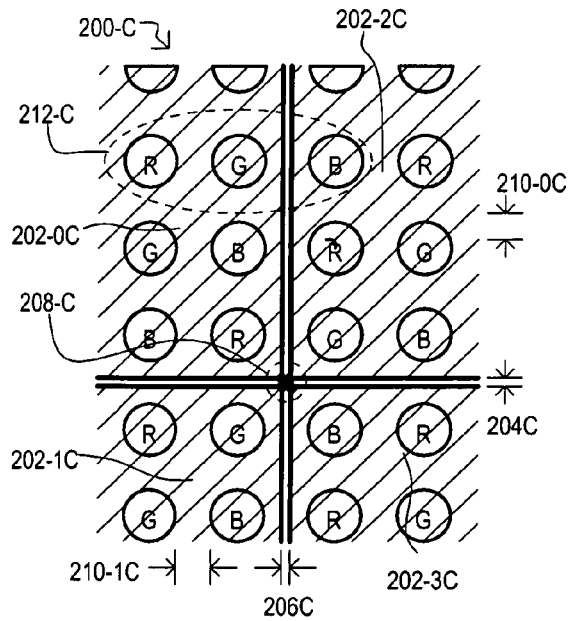

While the embodiments of FIGS. 2A and 2B show particular pixel element shapes (i.e., rectangular), other embodiments may include pixel elements having different shapes and arrangements. FIG. 2C shows but one example of pixels having a different pixel element shape (in this case, circular). As in the embodiments of FIGS. 2A and 2B, spacings (204C and 206C) between sense pads may be aligned to fall within pixel element spacings (210-0C and 210-1C). Further, a bridging structure 208-C may also fall within a pixel element spacing.

Figure 2E:
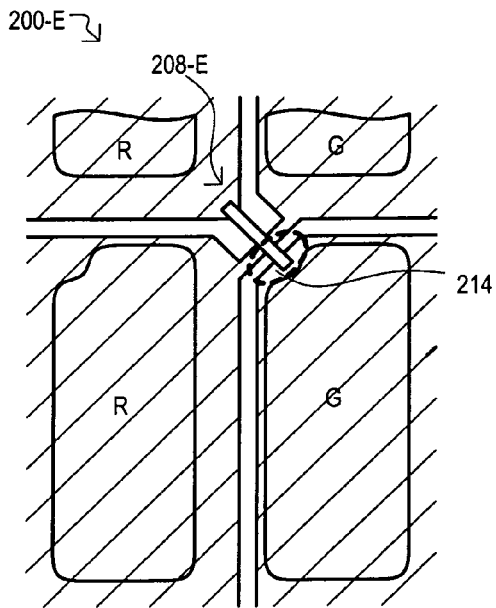
Figure 2D:
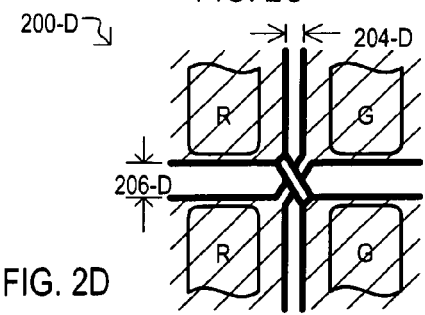

It is noted that spacings between sense pads need not be uniform. As but one example, FIG. 2D shows an arrangement in which a pad spacing 204-D in one direction may be smaller than a pad spacing 206-D in another direction. In other embodiments, a pad spacing 204-D may be larger than a pad spacing 206-D.

It is also noted that a shape of a pixel element spacing may vary. As but one example, FIG. 2E shows an embodiment in which a pixel spacing may include an encroachment area 214. An encroachment area may be a non-illuminating portion of a pixel elements having control elements and/or connections proximate to a light emitting portion. In the particular embodiment of FIG. 2E, a bridging structure 208-E may extend into (or alternatively be situated within) an encroachment area 214.

In this way, sense pads of a capacitance sense pad array may be arranged over a display, with pad spacings and bridging structures aligned within pixel element spacings.

Figure 3A:
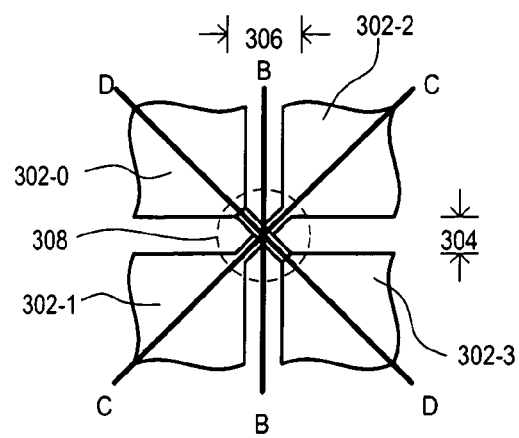
FIGS. 3A to 3C are views showing a bridging structure according to an embodiment.

Referring now to FIGS. 3A to 3D, one very particular example of a bridging structure is shown in a series of views. FIG. 3A shows a top plan view of a bridging structure 308 that may provide a conductive connection between a sense pad 302-0 and 302-3, as well as a separate conductive connection between sense pad 302-1 and 302-2.

Figure 3B:
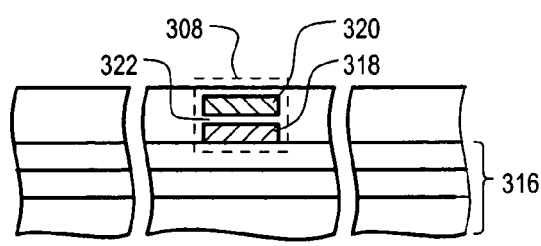

Referring now to FIG. 3B, a bridging structure 308 is shown in a side cross sectional view along plane B-B shown in FIG. 3A. A bridging structure 308 may be formed over a substrate 316, and may include a conductive member 318, and a bridging member 320. In the particular embodiment shown, a conductive member 318 may be formed on a substrate 316 and from a same layer (or layers) as sense pads (302-0 to 302-3). That is, sense pad 302-1, conductive member 318, and sense pad 302-2 may be a contiguous structure. Bridging structure 308 may be formed over a portion of display substrate 316 that does not include any pixel elements.

Figure 3C:
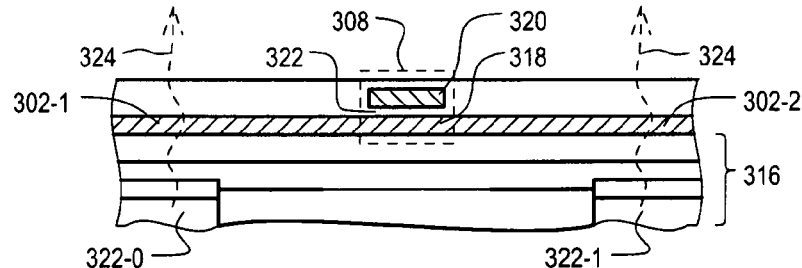

Referring now to FIG. 3C, a bridging structure 308 is shown in a side cross sectional view along plane C-C shown in FIG. 3A. The view of FIG. 3C shows conductive member 318, sense pad 302-1 and sense pad 302-2 as a contiguous structure, while bridging member 320 extends over conductive member 318. Thus, a conductive member may be situated within a same plane as sense pads (302-1 and 302-2), while bridging member 320 may be situated on another plane (e.g., over or under the sense pads) with the two conductors separated by dielectric spacer 322. FIG. 3C also shows pixel elements 322-0 and 322-1 formed in or positioned below display substrate 316. As shown by light path arrows 324, a light path from pixel elements (322-0 and 322-1) passes through a uniform structure that includes but one sense pad (302-1 or 302-2).

Figure 3D:
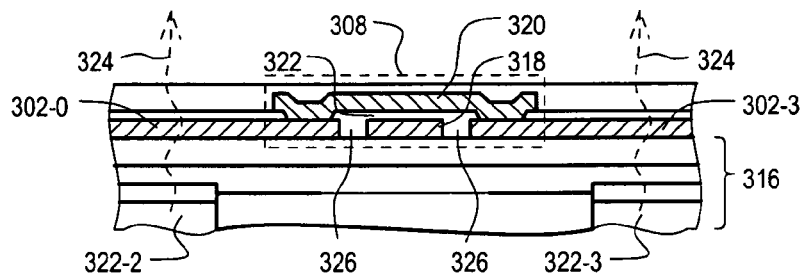

Referring now to FIG. 3D, a bridging structure 308 is shown in a side cross sectional view along plane D-D shown in FIG. 3A. The view of FIG. 3D shows how a conductive member 318 may be electrically isolated from sense pads 302-0 and 302-3 (disposed in a different diagonal direction) by gaps 326 and by dielectric separator 322. FIG. 3D also shows how bridging member 320 may provide a conductive connection between sense pads (302-0 and 302-3). FIG. 3D also shows pixel elements 322-2 and 322-3 formed in or positioned below display substrate 316. As in the case of FIG. 3C, as shown by light path arrows 324, a light path from pixel elements (322-2 and 322-3) passes through a uniform structure that includes but one sense pad (302-0 or 302-3).

It is noted that while FIGS. 3A to 3D show a bridging structure formed over a conductive member, alternate embodiments may include arrangements in which a bridging member is formed below a conductive member. That is, bridging structures may include both "overpass" and "underpass" conductive connections.

Referring to FIGS. 4 and 5A to 5C, methods of determining a touch position in capacitance sense pad array, like that shown in embodiments herein will now be described.

Referring now to FIG. 4, a sense pad array 400 may have a configuration like that shown in FIG. 1. FIG. 4 shows a sample contact (e.g., touch) location 428, for example, where an object (e.g., finger) may alter a capacitance at a portion of a sense pad array 400. Such a change in capacitance can affect sense pad group "A" and sense pad group "D". According to the orientation of such sense pad groups, a touch position may be determined. Superimposed over FIG. 4 are intercept lines 430-0 and 430-1 that may represent positions identified by a capacitance change sensed with sense pad groups A and D.

Referring to FIGS. 5A to 5C, various particular embodiments showing how a screen position may be determined are shown. Each embodiment shows extents of a touch screen display 531, and different contact location (at rectangular coordinates X,Y) on such screen displays. In the embodiments of FIGS. 5A to 5C, intercept lines (530-0A to 530-1C) are also shown corresponding to diagonal groups of sense pads detecting a touch at the X,Y position.

As shown in FIG. 5A, according to angles of intercept lines ($\theta_0$ and $\theta_1$), and an intercept position of such lines on an x and y axis ($X_0$, $X_1$, $Y_0$ and $Y_1$) an X and Y position (rectangular coordinate position) may be determined.

However, FIGS. 5A to 5C also show how if both intercept angles are the same ($\theta_0 = \theta_1$), and an X and Y intercept of both intercept lines are known, coordinates (X,Y) of a contact location may simplify to $(X_1/2)-(X_0/2)$ and $(Y_1/2)-(Y_0/2)$, for a relatively easy arithmetic derivation of an angular transform operation. In particular embodiments, for each group of sense pads such values may be stored. Thus, for the examples shown, for sense pad group corresponding to intercept line 530-0, values $X_0/2$ and $Y_0/2$ may be stored, while for sense pad group corresponding to intercept line 530-1, values $X_1/2$ and $Y_1/2$ may be stored. When contact is indicated at an intersection of such sense pad groups, two subtraction operations may derive the X,Y coordinates corresponding to such a contact location.

Such an angular conversion may be accomplished by custom circuits, or by a processor programmed to execute such an angular conversion operation, or equivalent.

In this way, positions indicated by capacitance sense pads arranged at a non-orthogonal angle with respect to a display may be converted to orthogonally referenced coordinates.

Referring now to FIG. 6, a touch screen system according to an embodiment is shown in a block diagram, and designated by the general reference number 600. A system 600 may include a capacitance sense array 601, a capacitance detect circuit 640, and a processing circuit 642. A capacitance sense array 601 may have a structure according to any of the embodiments shown herein, or equivalents. In particular, a capacitance sense array 601 may be single layer structure having multiple sense pads where gaps between such sense pads may be aligned between pixel element spacings of a corresponding display. Such a structure may present a uniform light path for pixel elements that includes but one capacitance sense layer between a display and touch screen surface.

Such a structure is in sharp contrast to touch screen designs that have some pixel elements below a capacitance sense layer, and other pixel elements below gaps in such a layer, resulting in non-uniform light paths.

In addition, such a structure is in contrast to touch screen designs that have multiple capacitance sense layers (i.e., one layer in a column direction, another in a row direction) which result in light paths for pixel elements that pass through not only more than one capacitance sense layer, but through an adhesive layer between the two capacitance sense layers, as well. Further, in such multi-layer capacitance sense designs, a vertical alignment tolerance between the two capacitance sense layers may make manufacturing expensive and/or complex, and add to a thickness of a touch screen. Still further, an adhesive layer between such capacitance sense layers may also add to overall cost in a touch screen device. Also, since the capacitance sense layers of the two substrates are not required to be of the same source batch, there may be differences in the optical transmittance of the separate capacitance sense layers which may also be visible to the user.

A capacitance detect circuit 640 may be connected to sense pad groups within sense array 601 by group connections (selected shown as 643) to detect contact location(s) for sense pad groups according to changes in capacitance. A processing circuit 642 may generate a position based on capacitance changes detected by capacitance detect circuit 640. Such a determination may be made according to any of the embodiments shown herein, or equivalents.

In this way, a touch screen system may include a single capacitance layer that provides a uniform light path for pixel elements.

While embodiments above have shown arrangements in which capacitance sense pads may have a rectangular (in this case, square) shape, other embodiments may include sense pads having different shapes. FIGS. 7A and 7B show two of many possible examples of capacitance sense arrays having capacitance sense pads of varying shapes.

FIG. 7A shows a capacitance sense array 700 having sense pads (one shown as 702) with a different rectangular shape. It is understood that FIG. 7A is not necessarily drawn to scale, and pad spacings (704 and 706) and well as bridging structures (one shown as 708) may fall within pixel element spacings.

FIG. 7B shows a capacitance sense array 700' having sense pads with various different shapes. As in the case of FIG. 7A, pad spacings (704' and 706') and well as bridging structures (one shown as 708') may fall within pixel element spacings.

In this way, a capacitance sense array may have sense pads with various shapes.

While the above embodiments have shown capacitance sense arrays and touch screens systems and devices, other embodiments may include methods for manufacturing such devices. One particular method according to an embodiment will now be described with reference to FIGS. 8A to 8I.

Figure 8A:
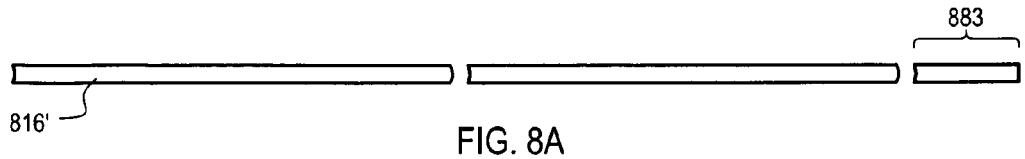
FIGS. 8A to 8I are side cross sectional views showing a method of manufacturing a touch screen according to an embodiment.

Referring to FIG. 8A, a substrate 816' may be formed on which a capacitance sense array may be created. As will be described in more detail below, a substrate 816' may be aligned to, bonded to, or otherwise formed on a display substrate that includes pixel elements. In the very particular embodiment shown, a substrate 816' may include an alignment area 883 in which alignment features may be formed to enable a substrate 816' to be aligned over (and/or on) a display substrate. It is understood that there may be two or more such alignment portions on substrate 816' to ensure alignment in more than one direction. A substrate 816' may be a transparent material.

Figure 8B:
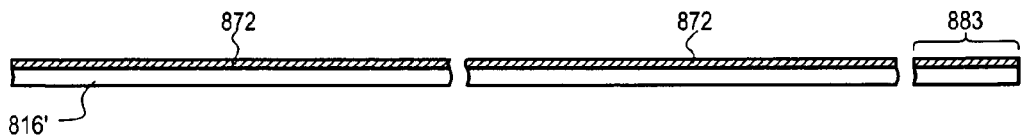

Referring to FIG. 8B, a capacitance sense film 872 may be formed on a substrate 816'. A capacitance sense film 872 may be formed from one or more transparent and conductive materials, such as indium tin oxide (ITO). In one very particular embodiment, a capacitance sense film 872 may be a single layer of ITO having a thickness of about 50 nm. In alternate embodiments, a capacitance sense film may include other types if transparent conducting materials, including other transparent conducting oxides (TCOs) (e.g., tin oxide, titanium niobate). In the very particular embodiment shown, a capacitance sense film 872 may also be formed within an alignment area 883.

Figure 8C:
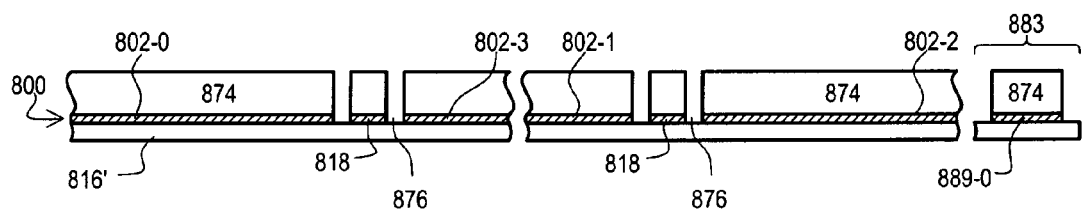

Referring to FIG. 8C, an array etch mask 874 may be formed over capacitance sense film 872. An array etch mask 874 may transfer a desired array mask pattern to capacitance sense film 872. In the very particular embodiment shown, an array etch mask 874 may have openings a positions where gaps (i.e., pad spacings) are to be formed. FIG. 8C shows a touch screen device following an etch step that forms gaps 876 in a capacitance sense film to create a capacitance sense array 800 having sense pads 802-0 to 802-3. In the particular example shown, gaps 876 may be gaps formed at locations of bridging structures 808. In the very particular embodiment shown, array etch mask 874 may also form a portion of an alignment feature 889-0 from capacitance sense film within alignment area 883.

Figure 8D:
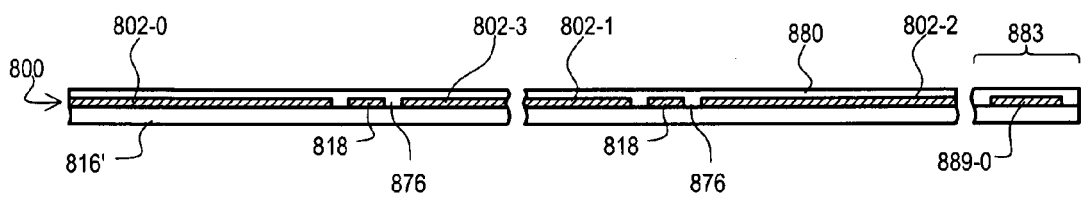

Referring to FIG. 8D, insulating material 880 may be formed within gaps and on a top surface of capacitance sense array 800. An insulating material 880 may be formed from one or more transparent and insulating materials. In one very particular embodiment, an insulating material 880 may include silicon dioxide having a thickness of about 50 nm.

Figure 8E:
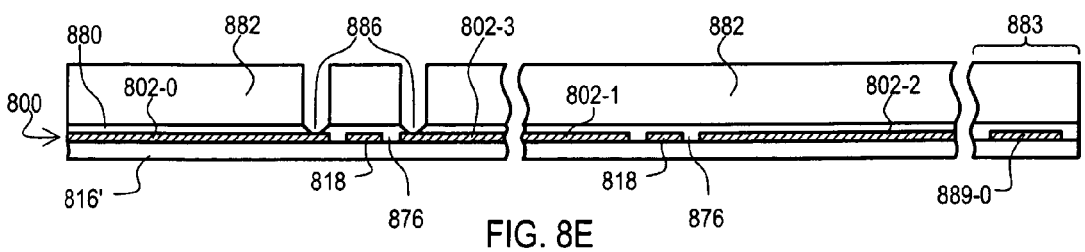

Referring to FIG. 8E, a bridge contact etch mask 882 may be formed over insulating material 880. A bridge contact etch mask 882 may transfer a desired bridge contact pattern through insulating material 880. In the very particular embodiment shown, a bridge contact etch mask 882 may have openings at positions where contacts to sense pads (802-0 to 802-3) may be formed. FIG. 8E shows a structure following an etch step that forms contact openings 886 through insulating material 880 that expose a portion of a surface of sense pads 802-0 and 802-3.

Figure 8F:
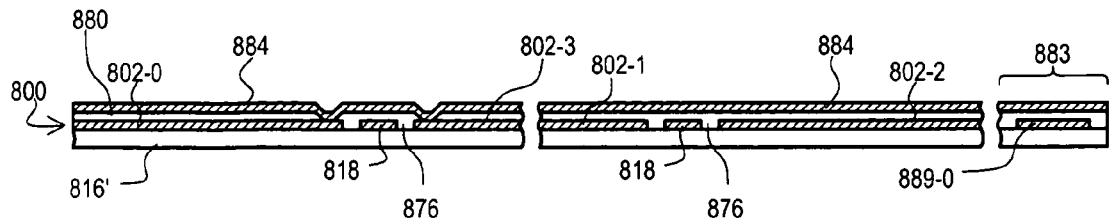

Referring to FIG. 8F, a conductive bridge film 884 may be formed over insulating material 880 and within contact openings 886 to create a conductive connection between sense pads 802-0 and 802-3. A conductive bridge film 884 may be formed from a conductive material that may or may not be transparent. In one particular embodiment, a conductive bridge film may be formed from a same material as capacitance sense array. Even more particularly, a conductive bridge film 884 may include a layer of ITO having a thickness of about 50 nm. In the very particular embodiment shown, a conductive bridge film 884 may also be formed within an alignment area 883.

Figure 8G:
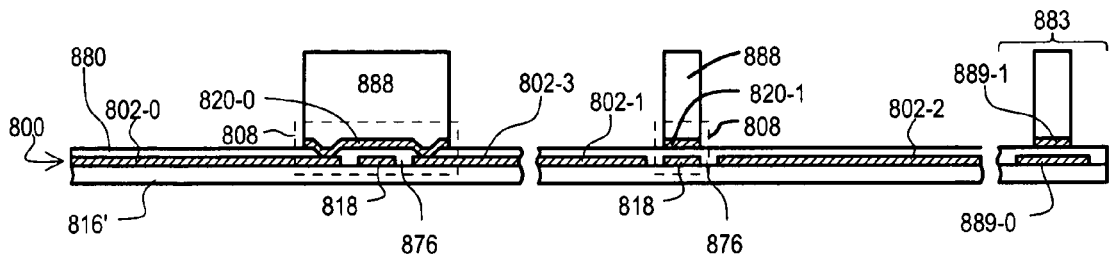

Referring to FIG. 8G, a bridge member mask 888 may be formed over conductive bridge film 884. A bridge member mask 888 may transfer a desired bridging member pattern to conductive bridge film 884. In the very particular embodiment shown, a bridge member mask 888 may cover only locations where a bridging member is to be formed. FIG. 8G shows a structure following an etch step that forms bridging members 820-0 and 820-1. Bridging member 820-0 may provide a conductive connection between sense pad 802-0 and sense pad 802-3. In the very particular embodiment shown, bridge member mask 874 may also form another portion of an alignment feature 889-1 from the conductive bridge film within alignment area 883.

Figure 8H:
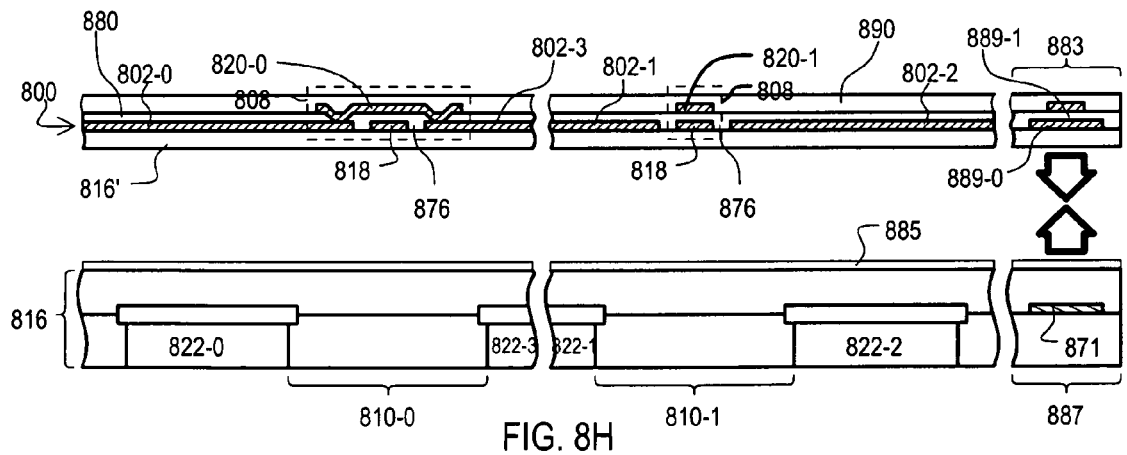

FIG. 8H shows the formation of a protective, transparent top surface 890 over capacitance sense array 800 and bridging members (820-0 and 820-1).

FIG. 8H also shows a substrate 816' being assembled with a display substrate 816. A display substrate 816 may include pixel elements 822-0 to 822-3 separated from one another by a pixel element spacing (810-0 and 810-1). As shown in FIG. 8H, a substrate 816 containing capacitance sense array 800 may be aligned with display substrate 816 so that bridging structures 808 and edges of sense pads (802-0 to 802-3) may be aligned within a pixel element spacing (810-0 and 810-1). In the very particular embodiment shown, a display substrate 816 may include display alignment areas (one shown as 887) corresponding to alignment areas 883 of substrate 816. Display alignment areas (e.g., 887) may each include a display alignment feature (one shown as 871) that may be aligned with one or both alignment features 889-0/1 of substrate 816', to thereby ensure that pixel elements (822-0 to 822-3) have a uniform light transmission path through but one capacitance sense pad.

In the particular embodiment of FIG. 8H, a substrate 816' may be bonded to a display substrate 816 with a transparent adhesive 885.

Figure 8I:
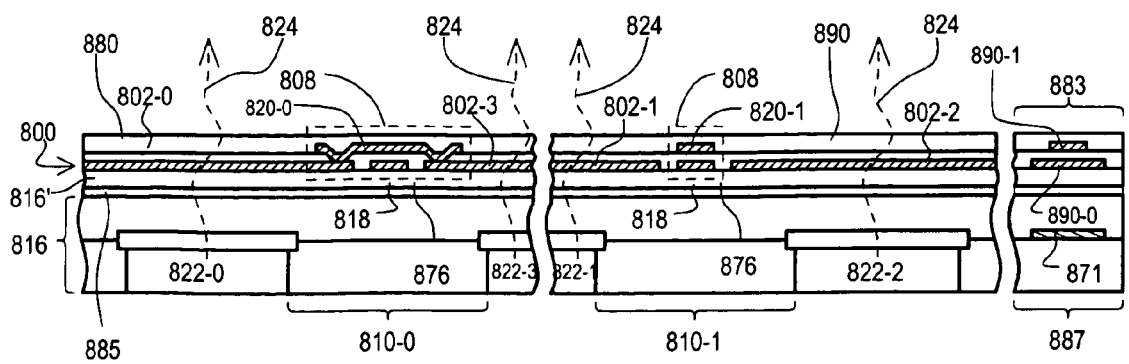

FIG. 8I shows a touch screen device formed by assembling substrate 816 to display substrate 816' with a proper alignment. As shown, a light transmission path 824 from pixel elements (822-0 to 822-3) passes through but one capacitance sense layer (e.g., one sense pad).

In this way, a touch screen device may be formed having but one capacitance sense layer between a display substrate and a top surface (i.e., a display and touch surface).

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A touch screen contact position determination method, comprising:
    detecting a change in capacitance at an intersection of at least two groups of sense pads disposed in different diagonal directions with respect to orthogonal directions of a touch screen area;
    translating a point of intersection of the two groups of sense pads into coordinates of the orthogonal directions, wherein each group of sense pads has a first intercept value and a second intercept value, the first intercept value corresponding to a position where the diagonal of the group of sense pads intersects a first axis of the orthogonal directions, and the second intercept value corresponding to a position where the diagonal of the group of sense pads intersects a second axis of the orthogonal directions; and
    translating the point of intersection includes one arithmetic operation between the first intercept values and one arithmetic operation between the second intercept values of the intersecting sense pad groups.

2. The method of claim 1, wherein:
the arithmetic operation includes a subtraction operation.

3. The method of claim 1, wherein:
each first intercept value is a coordinate value that is about one half of the coordinate where the diagonal intersects the first axis, and each second intercept value is a coordinate value that is about one half of the coordinate where the diagonal intersects the second.

4. The method of claim 1, wherein:

detecting a change in capacitance at an intersection of two groups of sense pads includes activating each of a plurality of first groups of sense pads, each first group of sense pads having diagonals parallel to one another, activating each of a plurality of second groups of sense pads, each second group of sense pads having diagonals parallel to one another but not parallel to the diagonals of the first groups of sense pads.

5. The method of claim 1, further including:

transmitting light through the sense pads with a display having pixel elements arranged in an array that extends in the orthogonal directions, the pixel elements comprising pixels having positions indicated by the coordinates of the orthogonal direction.

* * * * *